United States Patent
Harbers et al.

(10) Patent No.: US 10,356,881 B2
(45) Date of Patent: Jul. 16, 2019

(54) LED-BASED LIGHTING CONTROL NETWORK COMMUNICATION

(71) Applicant: Xicato, Inc., San Jose, CA (US)

(72) Inventors: Gerard Harbers, Sunnyvale, CA (US); Barry Mark Loveridge, San Jose, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 16/119,973

(22) Filed: Aug. 31, 2018

(65) Prior Publication Data

US 2018/0376568 A1 Dec. 27, 2018

Related U.S. Application Data

(62) Division of application No. 15/432,784, filed on Feb. 14, 2017, now Pat. No. 10,070,503, which is a
(Continued)

(51) Int. Cl.
*H05B 37/02* (2006.01)
*H05B 33/08* (2006.01)
(Continued)

(52) U.S. Cl.
CPC ....... *H05B 37/0263* (2013.01); *H04L 67/125* (2013.01); *H05B 33/089* (2013.01);
(Continued)

(58) Field of Classification Search
CPC ............ H05B 37/0263; H05B 37/0272; H05B 37/0254; H05B 33/089; H05B 33/0842;
(Continued)

(56) References Cited

U.S. PATENT DOCUMENTS

| 5,959,316 A | 9/1999 | Lowery |
| 6,181,086 B1 | 1/2001 | Katyl et al. |

(Continued)

FOREIGN PATENT DOCUMENTS

| EP | 2560463 A2 | 2/2013 |
| WO | 2006106451 A1 | 10/2006 |

(Continued)

OTHER PUBLICATIONS

Invitation to Pay Additional Fees dated Sep. 25, 2014 for International Application No. PCT/US2014/044927 filed on Jun. 30, 2014 by Xicato, Inc., 4 pages.
(Continued)

*Primary Examiner* — Daniel D Chang
(74) *Attorney, Agent, or Firm* — Silicon Valley Patent Group LLP

(57) ABSTRACT

An LED based illumination device includes a receiver and a transmitter for communications adhering to a lighting control communications protocol and a high speed communications protocol. The LED based illumination device may be part of a lighting control network, wherein the data transmission rate of the high speed communications protocol is more than twice that of the lighting control communications protocol. The lighting control network may be coupled to a digital communications gateway, including a digital communications interface configured to be coupled to a network operating in accordance with an internet protocol and a lighting control network interface coupled to the lighting control network. A processor determines a summary status value of the LED based illumination device based on information stored in memory of the digital communications gateway. The digital communications gateway may periodically transmit the time of day to the LED based illumination device over the lighting control network.

10 Claims, 10 Drawing Sheets

Related U.S. Application Data division of application No. 14/318,405, filed on Jun. 27, 2014, now Pat. No. 9,591,726.

(60) Provisional application No. 61/842,293, filed on Jul. 2, 2013.

(51) Int. Cl.
*H04L 29/08* (2006.01)
*H04W 84/12* (2009.01)
*H04W 4/80* (2018.01)
*F21V 29/74* (2015.01)
*F21K 9/68* (2016.01)

(52) U.S. Cl.
CPC ..... *H05B 33/0842* (2013.01); *H05B 33/0845* (2013.01); *H05B 33/0887* (2013.01); *H05B 37/0254* (2013.01); *H05B 37/0272* (2013.01); *F21K 9/68* (2016.08); *F21V 29/74* (2015.01); *H04W 4/80* (2018.02); *H04W 84/12* (2013.01)

(58) Field of Classification Search
CPC ............ H05B 33/0887; H05B 33/0845; H04L 67/125; F21V 29/74; H04W 84/12; H04W 4/80; F21K 9/68
USPC ......................................................... 315/291
See application file for complete search history.

(56) References Cited

U.S. PATENT DOCUMENTS

| | | |
|---|---|---|
| 6,331,756 B1 | 12/2001 | Beiliveau |
| 6,351,069 B1 | 2/2002 | Lowery et al. |
| 6,504,301 B1 | 1/2003 | Lowery |
| 6,586,882 B1 | 7/2003 | Harbers |
| 6,600,175 B1 | 7/2003 | Baretz et al. |
| 6,680,569 B2 | 1/2004 | Mueller-Mach et al. |
| 6,812,500 B2 | 11/2004 | Reeh et al. |
| 7,126,162 B2 | 10/2006 | Reeh et al. |
| 7,250,715 B2 | 7/2007 | Mueller et al. |
| 7,479,662 B2 | 1/2009 | Soules et al. |
| 7,564,180 B2 | 7/2009 | Brandes |
| 7,614,759 B2 | 11/2009 | Negley |
| 7,629,621 B2 | 12/2009 | Reeh et al. |
| 8,519,714 B2 | 8/2013 | Harbers |
| 8,952,626 B2 | 2/2015 | Huang et al. |
| 2005/0024219 A1 | 2/2005 | Childers |
| 2006/0109389 A1 | 5/2006 | Ichikawa et al. |
| 2006/0256907 A1 | 11/2006 | Stalker et al. |
| 2007/0081336 A1 | 4/2007 | Bierhuizen et al. |
| 2007/0293208 A1 | 12/2007 | Loh et al. |
| 2008/0024694 A1 | 1/2008 | Kondo et al. |
| 2008/0265799 A1 | 10/2008 | Sibert |
| 2009/0021955 A1 | 1/2009 | Kuang et al. |
| 2009/0091913 A1 | 4/2009 | Li et al. |
| 2009/0150004 A1 | 6/2009 | Wang et al. |
| 2009/0254287 A1 | 10/2009 | Ohgoh |
| 2010/0007277 A1 | 1/2010 | Woodward et al. |
| 2010/0176746 A1 | 7/2010 | Catalano et al. |
| 2010/0231613 A1 | 9/2010 | Hamada |
| 2010/0301777 A1 | 12/2010 | Kraemer |
| 2010/0327872 A1 | 12/2010 | Cheri et al. |
| 2011/0001436 A1 | 1/2011 | Chemel et al. |
| 2011/0069094 A1 | 3/2011 | Knapp |
| 2012/0040606 A1 | 2/2012 | Verfuerth |
| 2012/0206051 A1* | 8/2012 | Nieuwlands ....... H05B 37/0227 315/153 |
| 2013/0119894 A1 | 5/2013 | Yeh et al. |
| 2013/0315280 A1 | 11/2013 | Harbers |
| 2014/0265879 A1 | 9/2014 | Dillen |
| 2015/0130368 A1 | 5/2015 | Harbers |
| 2016/0127875 A1* | 5/2016 | Zampini, II .......... H04W 4/043 370/311 |
| 2017/0150583 A1 | 5/2017 | Harbers et al. |

FOREIGN PATENT DOCUMENTS

| | | |
|---|---|---|
| WO | 2007036886 A2 | 4/2007 |
| WO | 2011055259 A1 | 5/2011 |
| WO | 2013057646 A1 | 4/2013 |

OTHER PUBLICATIONS

International Search Report and Written Opinion dated Dec. 15, 2014 for International Application No. PCT/US2014/044927 filed on Jun. 30, 2014 by Xicato, Inc., 13 pages.
International Search Report and Written Opinion dated Jun. 26, 2015 for International Application No. PCT/US2015/012307 filed on Jan. 21, 2015 by Xicato, Inc., 9 pages.

\* cited by examiner

LED-BASED LIGHTING CONTROL NETWORK COMMUNICATION

CROSS REFERENCE TO RELATED APPLICATIONS

This application is a divisional of and claims priority to U.S. application Ser. No. 15/432,784, filed Feb. 14, 2017, which is a divisional of and claims priority to U.S. application Ser. No. 14/318,405, filed Jun. 27, 2014, which claims priority under 35 USC 119 to U.S. Provisional Application No. 61/842,293, filed Jul. 2, 2013, all of which are incorporated by reference herein in their entireties.

TECHNICAL FIELD

The described embodiments relate to illumination devices that include Light Emitting Diodes (LEDs), and more particularly to LED based illumination devices capable of being connected to a network.

BACKGROUND

The use of LEDs in general lighting is becoming more desirable. Typically, LED illumination devices are stand-alone units. It is desirable, however, to connect LED illumination devices.

SUMMARY

An LED based illumination device includes a receiver and a transmitter for communications adhering to a lighting control communications protocol and a high speed communications protocol. The LED based illumination device may be part of a lighting control network, wherein the data transmission rate of the high speed communications protocol is more than twice that of the lighting control communications protocol. The lighting control network may be coupled to a digital communications gateway, including a digital communications interface configured to be coupled to a network operating in accordance with an internet protocol and a lighting control network interface coupled to the lighting control network. A processor determines a summary status value of the LED based illumination device based on information stored in memory of the digital communications gateway. The digital communications gateway may periodically transmit the time of day to the LED based illumination device over the lighting control network.

Further details and embodiments and techniques are described in the detailed description below. This summary does not define the invention. The invention is defined by the claims.

DETAILED DESCRIPTION

Reference will now be made in detail to background examples and some embodiments of the invention, examples of which are illustrated in the accompanying drawings.

Figure 1:
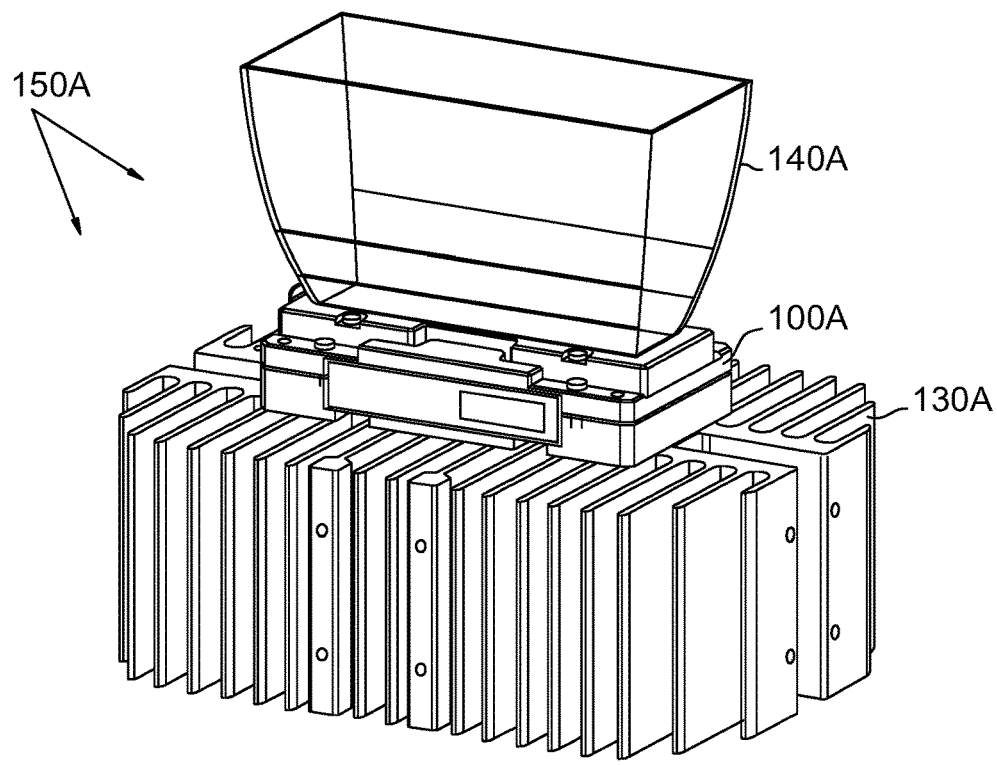
FIGS. 1-2 illustrate perspective views of an exemplary luminaire.
Figure 2:
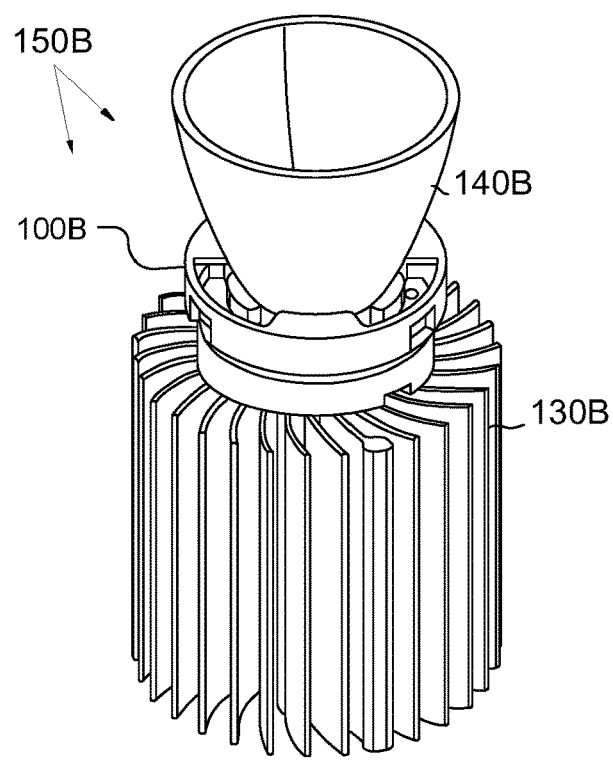

FIGS. 1-2 illustrate two exemplary luminaires, respectively labeled 150A and 150B (sometimes collectively or generally referred to as luminaire 150). The luminaire 150A illustrated in FIG. 1 includes an LED based illumination device 100A with a rectangular form factor. The luminaire 150B illustrated in FIG. 2 includes an LED based illumination device 100B with a circular form factor. These examples are for illustrative purposes. Examples of LED based illumination devices of general polygonal and elliptical shapes may also be contemplated. FIG. 1 illustrates luminaire 150A with an LED based illumination device 100A, reflector 140A, and light fixture 130A. FIG. 2 illustrates luminaire 150B with an LED based illumination module 100B, reflector 140B, and light fixture 130B. For the sake of simplicity, LED based illumination module 100A and 100B may be collectively referred to as illumination module 100, reflector 140A and 140B may be collectively referred to as reflector 140, and light fixture 130A and 130B may be collectively referred to as light fixture 130. As depicted, light fixture 130 is a heat sink, and thus, may sometimes be referred as heat sink 130. However, light fixture 130 may include other structural and decorative elements (not shown). Reflector 140 is mounted to illumination device 100 to collimate or deflect light emitted from LED based illumination device 100. The reflector 140 may be made from a thermally conductive material, such as a material that includes aluminum or copper and may be thermally coupled to illumination device 100. Heat flows by conduction through illumination device 100 and the thermally conductive reflector 140. Heat also flows via thermal convection over the reflector 140. Reflector 140 may be a compound parabolic concentrator, where the concentrator is constructed of or coated with a highly reflecting material. Compound parabolic concentrators tend to be tall, but they often are used in a reduced length form, which increases the beam angle. An advantage of this configuration is that no additional diffusers are required to homogenize the light, which increases the throughput efficiency. Optical elements, such as a diffuser or reflector 140 may be removably coupled to illumination device 100, e.g., by means of threads, a clamp, a twist-lock mechanism, or other appropriate arrangement.

As depicted in FIGS. 1 and 2, LED based illumination device 100 is mounted to heat sink 130. Heat sink 130 may be made from a thermally conductive material, such as a material that includes aluminum or copper and may be thermally coupled to LED based illumination device 100. Heat flows by conduction through LED based illumination device 100 and the thermally conductive heat sink 130. Heat also flows via thermal convection over heat sink 130. LED based illumination device 100 may be attached to heat sink 130 by way of screw threads to clamp the LED based illumination device 100 to the heat sink 130. To facilitate easy removal and replacement of LED based illumination device 100, LED based illumination device 100 may be removably coupled to heat sink 130, e.g., by means of a clamp mechanism, a twist-lock mechanism, or other appropriate arrangement. LED based illumination device 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the LED based illumination device 100.

Figure 3:
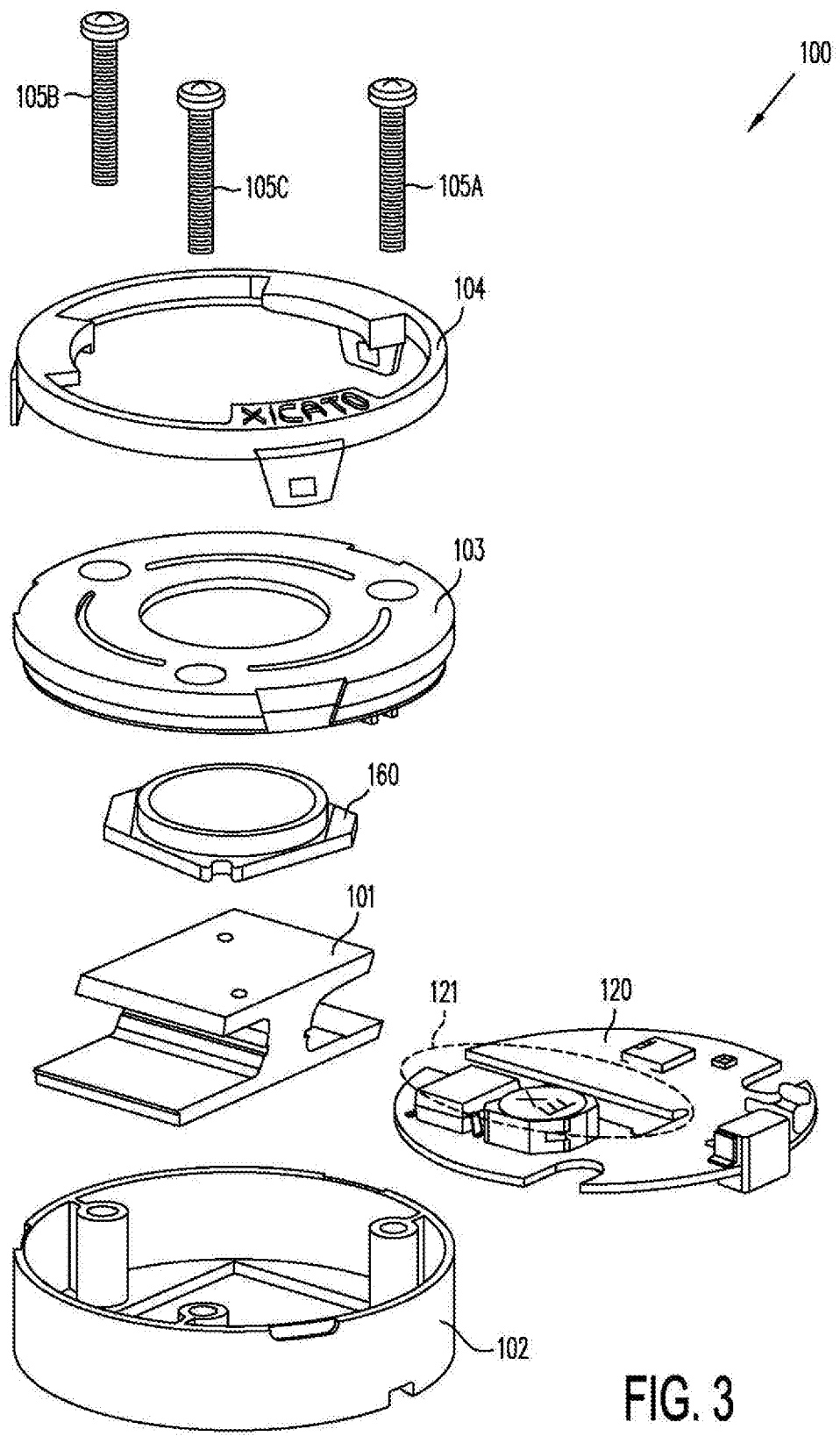
FIG. 3 shows an exploded view illustrating components of LED based illumination device as depicted in FIG. 2.

FIG. 3 shows an exploded view illustrating components of LED based illumination device 100 as depicted in FIG. 2. It should be understood that as defined herein an LED based illumination device is not an LED, but is an LED light source or fixture or component part of an LED light source or fixture. LED based illumination device 100 includes an LED based light engine 160 configured to generate an amount of light. LED based light engine 160 is coupled to I-beam shaped frame 101 to promote heat extraction from LED based light engine 160. Optionally, an electronic interface module (EIM) 120 is located between the flanges of I-beam shaped frame 101. LED based light engine 160 and I-beam shaped frame 101 are enclosed between a lower housing 102 and an upper housing 103. An optional reflector retainer 104 is coupled to upper housing 103. Reflector retainer 104 is configured to facilitate attachment of different reflectors to the LED based illumination device 100. Fasteners 105A-C are employed to affix LED based illumination device 100 to a heat sink.

Figure 4:
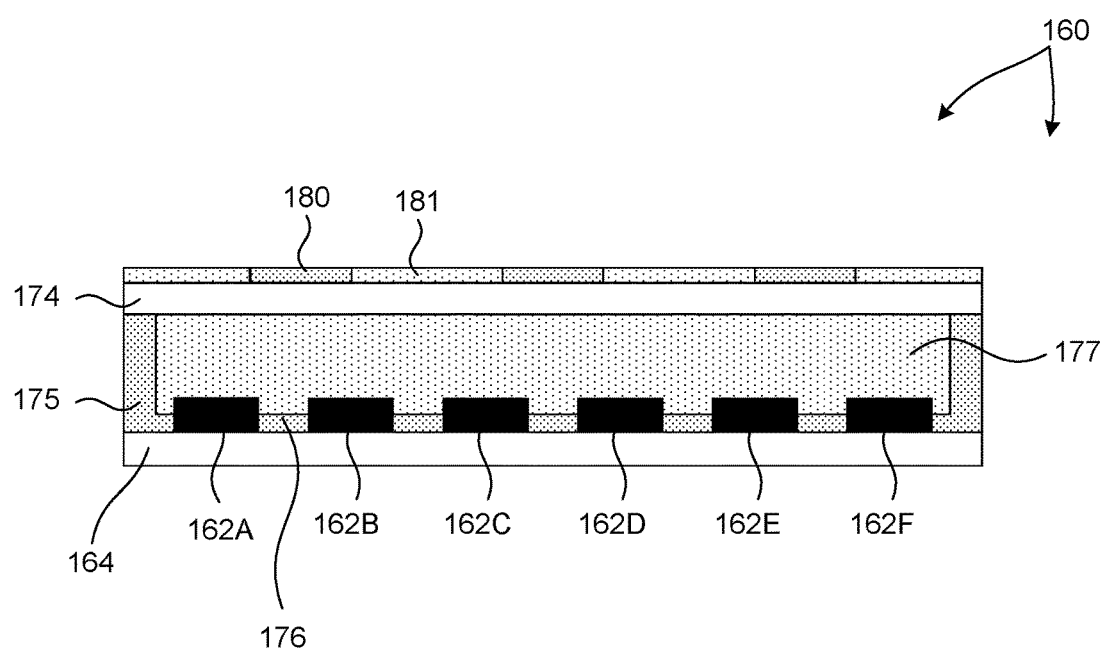
FIG. 4 is illustrative of an embodiment of an LED based light emitting engine.

FIG. 4 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 4, LED based light engine 160 includes a number of LEDs 162A-F (collectively referred to as LEDs 162) mounted to mounting board 164 in a chip on board (COB) configuration. The spaces between each LED are filled with a reflective material 176 (e.g., a white silicone material). In addition, a dam of reflective material 175 surrounds the LEDs 162 and supports transmissive plate 174. The space between LEDs 162 and transmissive plate 174 is filled with an encapsulating material 177 (e.g., silicone) to promote light extraction from LEDs 162 and to separate LEDs 162 from the environment. In the depicted embodiment, the dam of reflective material 175 is both the thermally conductive structure that conducts heat from transmissive plate 174 to LED mounting board 164 and the optically reflective structure that reflects incident light from LEDs 162 toward transmissive plate 174.

LEDs 162 can emit different or the same color light, either by direct emission or by phosphor conversion, e.g., where phosphor layers are applied to the LEDs as part of the LED package. The illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the illumination device 100 has a desired color when LEDs 162 are used in combination with wavelength converting materials on transmissive plate 174, for example. By tuning the chemical and/or physical (such as thickness and concentration) properties of the wavelength converting materials and the geometric properties of the coatings on the surface of transmissive plate 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)AlSiN$_3$:Eu, CaAlSiN$_3$:Eu, CaAlSi(ON)$_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive plate 174. In one embodiment a red emitting phosphor 181 such as an alkaline earth oxy silicon nitride covers a portion of transmissive plate 174, and a yellow emitting phosphor 180 such as a YAG phosphor covers another portion of transmissive plate 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174, and selecting which portions of transmissive plate 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174. By way of example, a red emitting phosphor 181 may be patterned on different areas of the transmissive plate 174 and a yellow emitting phosphor 180 may be patterned on other areas of transmissive plate 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive plate 174 may be constructed from a suitable optically transmissive material (e.g., sapphire, quartz, alumina, crown glass, polycarbonate, and other plastics). Transmissive plate 174 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive plate 174 directly to the surface of the LED 162. In this manner, the direct thermal contact between transmissive plate 174 and LEDs 162 promotes heat dissipation from LEDs 162. In some other embodiments, the space between mounting board 164 and transmissive plate 174 may be filled with a solid encapsulate material. By way of example, silicone may be used to fill the space. In some other embodiments, the space may be filled with a fluid to promote heat extraction from LEDs 162.

In the embodiment illustrated in FIG. 4, the surface of patterned transmissive plate 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple transmissive plate 174 to LEDs 162 in any of the embodiments described herein.

In some embodiments, multiple, stacked transmissive layers are employed. Each transmissive layer includes different wavelength converting materials. For example, a transmissive layer including a wavelength converting material may be placed over another transmissive layer including a different wavelength converting material. In this manner, the color point of light emitted from LED based illumination device 100 may be tuned by replacing the different transmissive layers independently to achieve a desired color point. In some embodiments, the different transmissive layers may be placed in contact with each other to promote light extraction. In some other embodiments, the different transmissive layers may be separated by a distance to promote cooling of the transmissive layers. For example, airflow may by introduced through the space to cool the transmissive layers.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light of similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the board 164 and the bottom of the board 164. In one example, the bottom of mounting board 164 may be thermally coupled to a heat sink 130 (shown in FIGS. 1 and 2) via I-beam shaped frame 101. In other examples, mounting board 164 may be directly coupled to a heat sink, or a lighting fixture and/or other mechanisms to dissipate the heat, such as a fan. In some embodiments, the mounting board 164 conducts heat to a heat sink thermally coupled to the top of the board 164. Mounting board 164 may be an FR4 board, e.g., that is 0.5 mm thick, with relatively thick copper layers, e.g., 30 µm to 100 µm, on the top and bottom surfaces that serve as thermal contact areas. In other examples, the board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 5:
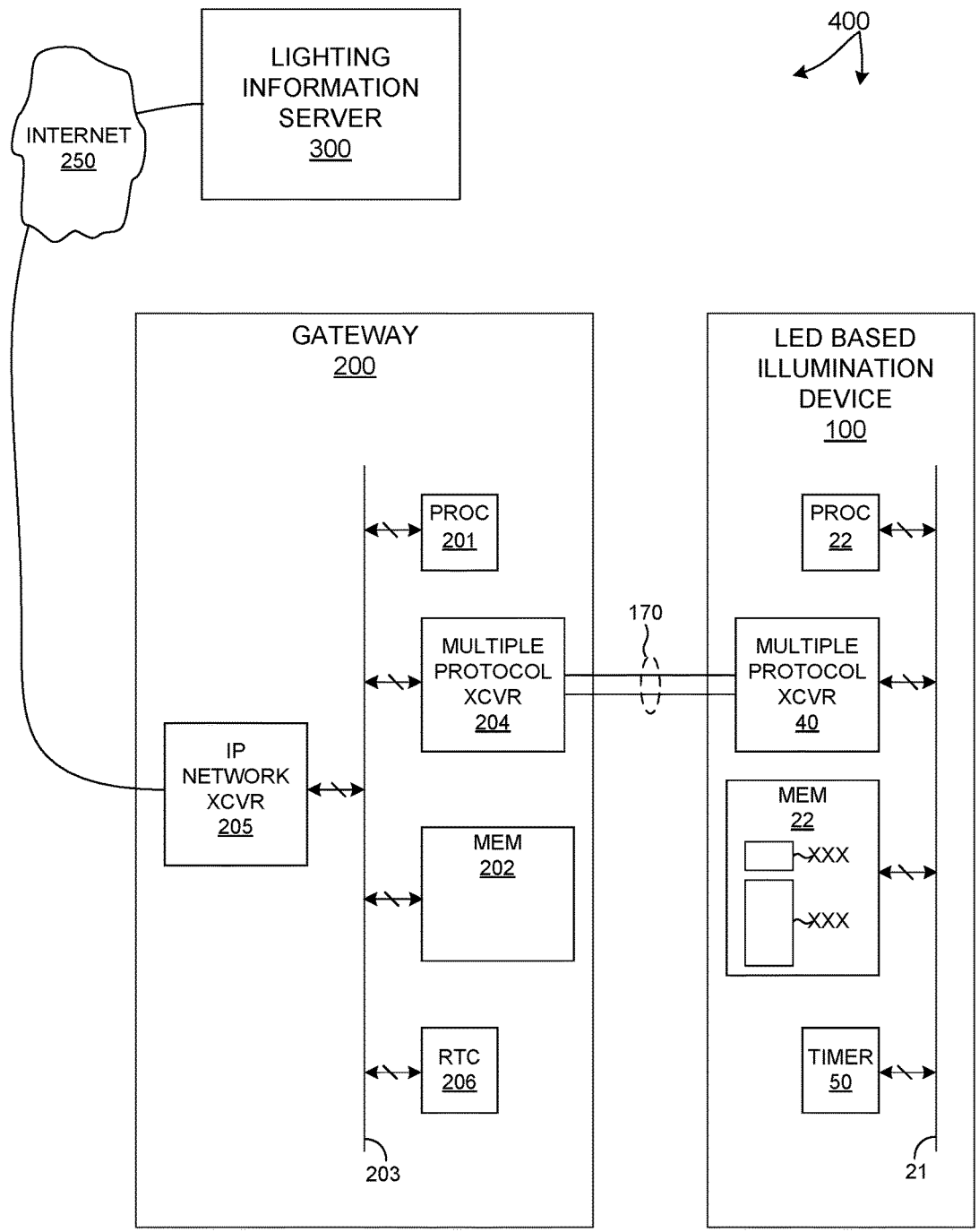
FIG. 5 is a schematic diagram illustrative of an LED based lighting control system.

FIG. 5 is a schematic diagram illustrative of an LED based lighting control system 400. As depicted in FIG. 5, LED based illumination device 100 is communicatively coupled to a gateway 200 by a set of conductors 170. The set of conductors 170 may include two or more conductors configured to communicate control signals between gateway 200 and LED based illumination device 100 in accordance with a lighting control communications protocol. By way of non-limiting example, the lighting control communications protocol may adhere to any of a digital addressable lighting interface (DALI) communications protocol, a 0-10 Volt control communications protocol, a DMX communications protocol, etc. Gateway 200 is also communicatively coupled to a lighting information server 300. In some examples, a communications link is established between lighting information server 300 and gateway 200 over the internet 250. In some examples, the communication link is established over a local area network with controlled access to the internet. In general, gateway 200 is coupled to a network operating in accordance with the internet protocol (IP). In some embodiments, the internet protocol is internet protocol version six (IPv6). In this manner, the advantages of scale (e.g., security, cost, speed, etc.) of an IP based network are leveraged to some extent in the lighting control system.

In general, the extension of an IP based network to each device in a lighting installation remains limited due to cost and installation complexity. In general, the communications link between the gateway 200 and LED based illumination device 100 should be simple, robust, and offer control flexibility at a very low cost. In one example, lighting control networks implementing the DALI communications protocol have been established to achieve these goals. However, the simplicity of the DALI communications protocol also introduces some limitations. For example, the specified data transmission rate over the DALI network limits the amount of data traffic that can pass through the DALI network. In addition, the limited addressing space available on the DALI network limits direct access to a large number of lighting devices by a central controller. These limitations are a bottleneck in the free flow of information to and from devices coupled to a lighting control network such as LED based illumination device 100.

In one aspect, the amount of data traffic communicated between LED based illumination device 100 and gateway 200 is reduced by caching data associated with LED based illumination device 100 on gateway 200 for ready access over the IP based network.

As depicted in FIG. 5, digital communications gateway 200 includes an IP network transceiver 205 configured as the network interface between gateway 200 and the network operating in accordance with an internet protocol. Gateway 200 also includes a multiple protocol transceiver 204 configured as the network interface between gateway 200 and devices coupled to the lighting control network, such as LED based illumination device 100. Gateway 200 includes a bus 203 communicatively coupled to elements of gateway 200 (e.g., processor 201, multiple protocol transceiver 204, IP network transceiver 205, memory 202, and real time clock 206) such that digital data may be communicated among these elements over bus 203. LED based illumination device 100 includes a multiple protocol transceiver 40 configured as the network interface between LED based illumination device 100 and the lighting control network formed by the set of conductors 170.

Figure 6:
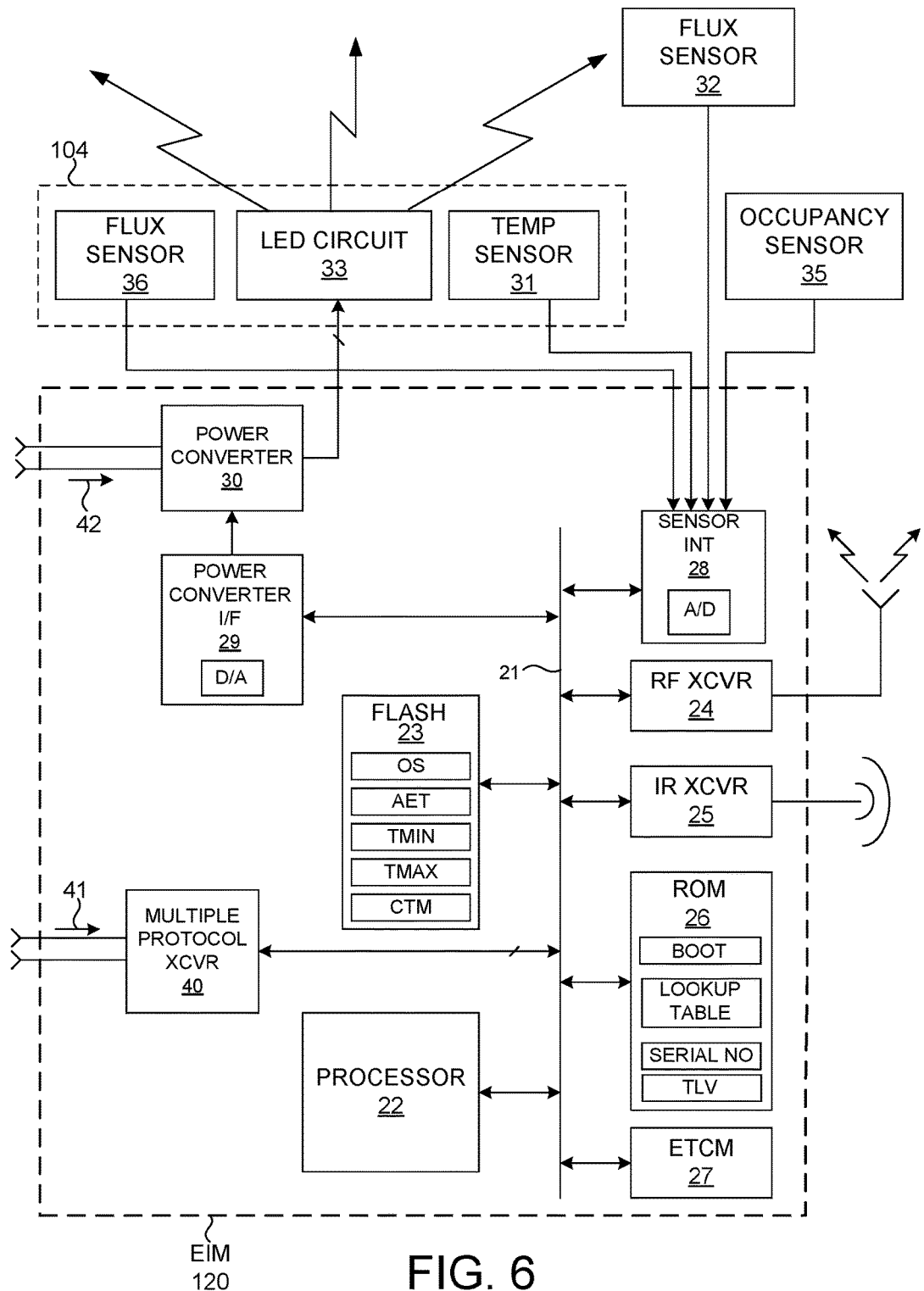
FIG. 6 is a schematic diagram illustrative of an electronic interface module.

LED based illumination device 100 is configured to generate a significant amount of data useful to characterize its operation, the surrounding environment, and prospects for future operation. FIG. 6 is a schematic diagram illustrative of EIM 120 of LED based illumination device 100 in greater detail. In the depicted embodiment, EIM 120 includes bus 21, multiple protocol transceiver 40, processor 22, elapsed time counter module (ETCM) 27, an amount of non-volatile memory 26 (e.g. EPROM), an amount of non-volatile memory 23 (e.g. flash memory), infrared transceiver 25, RF transceiver 24, sensor interface 28, power converter interface 29, and power converter 30.

As depicted in FIG. 5, LED mounting board 164 is electrically coupled to EIM 120. LED mounting board 164 includes flux sensor 36, LED circuitry 33 including LEDs 162, and temperature sensor 31. EIM 120 is also coupled to flux sensor 32 and occupancy sensor 35 mounted to light fixture 130. In some embodiments, flux sensor 32 and occupancy sensor 35 may be mounted to an optic. In some embodiments, an occupancy sensor may also be mounted to mounting board 164. In some embodiments, any of an accelerometer, a pressure sensor, and a humidity sensor may be mounted to any element of LED based illumination device 100. For example, an accelerometer may be added to detect the orientation of illumination device 100 with respect to the gravitational field. In another example, the accelerometer may provide a measure of vibration present in the operating environment of illumination device 100. In another example, a humidity sensor may be added to provide a measure of the moisture content of the operating environment of illumination device 100. For example, if illumination device 100 is sealed to reliably operate in wet conditions, the humidity sensor may be employed to detect a failure of the seal and contamination of the illumination device. In another example, a pressure sensor may be employed to provide a measure of the pressure of the operating environment of illumination device 100. For example, if illumination device 100 is sealed and evacuated, or alternatively, sealed and pressurized, the pressure sensor may be employed to detect a failure of the seal.

EIM 120 is configured to receive power signals 42 communicated to power converter 30. Power converter 30 operates to perform power conversion to generate electrical signals to drive one or more LED circuits of circuitry 33. In some embodiments, power converter 30 operates in a current control mode to supply a controlled amount of current to LED circuits within a predefined voltage range. In some embodiments, power converter 30 is a direct current to direct current (DC-DC) power converter. In these embodiments, power signals 42 may have a nominal voltage of 48 volts. Power signals 42 are stepped down in voltage by DC-DC power converter 30 to voltage levels that meet the voltage requirements of each LED circuit coupled to DC-DC converter 30.

In some other embodiments, power converter 30 is an alternating current to direct current (AC-DC) power converter. In yet other embodiments, power converter 30 is an alternating current to alternating current (AC-AC) power converter. In embodiments employing AC-AC power converter 30, LEDs 162 mounted to mounting board 164 generate light from AC electrical signals. Power converter 30 may be single channel or multi-channel. Each channel of power converter 30 supplies electrical power to one LED circuit of series connected LEDs. In one embodiment power converter 30 operates in a constant current mode. This is particularly useful where LEDs are electrically connected in series. In some other embodiments, power converter 30 may operate as a constant voltage source. This may be particularly useful where LEDs are electrically connected in parallel.

As depicted, power converter 30 is coupled to power converter interface 29. In this embodiment, power converter interface 29 includes a digital to analog (D/A) capability. Digital commands may be generated by operation of processor 22 and communicated to power converter interface 29 over bus 21. Interface 29 converts the digital command signals to analog signals and communicates the resulting analog signals to power converter 30. Power converter 30 adjusts the current communicated to coupled LED circuits in response to the received analog signals. In some examples, power converter 30 may shut down in response to the received signals. In other examples, power converter 30 may pulse or modulate the current communicated to coupled LED circuits in response to the received analog signals. In some embodiments, power converter 30 is operable to receive digital command signals directly. In these embodiments, power converter interface 29 is not implemented. In some embodiments, power converter 30 is operable to transmit signals. For example, power converter 30 may transmit a signal indicating a power failure condition or power out of regulation condition through power converter interface 29 to bus 21.

EIM 120 includes several mechanisms for receiving data from and transmitting data to devices communicatively linked to illumination device 100. EIM 120 may receive and transmit data over multiple protocol transceiver 40, RF transceiver 24, and IR transceiver 25. In addition, EIM 120 may broadcast data by controlling the light output from illumination device 100. For example, processor 22 may command the current supplied by power converter 30 to periodically flash, or otherwise modulate in frequency or amplitude, the light output of LED circuitry 33. The pulses may be detectable by humans, e.g. flashing the light output by illumination device 100 in a sequence of three, one second pulses, every minute. The pulses may also be undetectable by humans, but detectable by a flux detector, e.g. pulsing the light output by illumination device 100 at one kilohertz. In these embodiments, the light output of illumination device 100 can be modulated to indicate a code.

EIM 120 may be constructed from a printed circuit board (PCB), a metal core PCB, a ceramic substrate, or a semiconductor substrate. Other types of boards may be used, such as those made of alumina (aluminum oxide in ceramic form), or aluminum nitride (also in ceramic form). EIM 120 may be a constructed as a plastic part including a plurality of insert molded metal conductors.

In one aspect, EIM 120 includes multiple protocol transceiver 40 receives incoming control signals 41 and communicates digital information to bus 21 based on the incoming signals.

Figure 11:
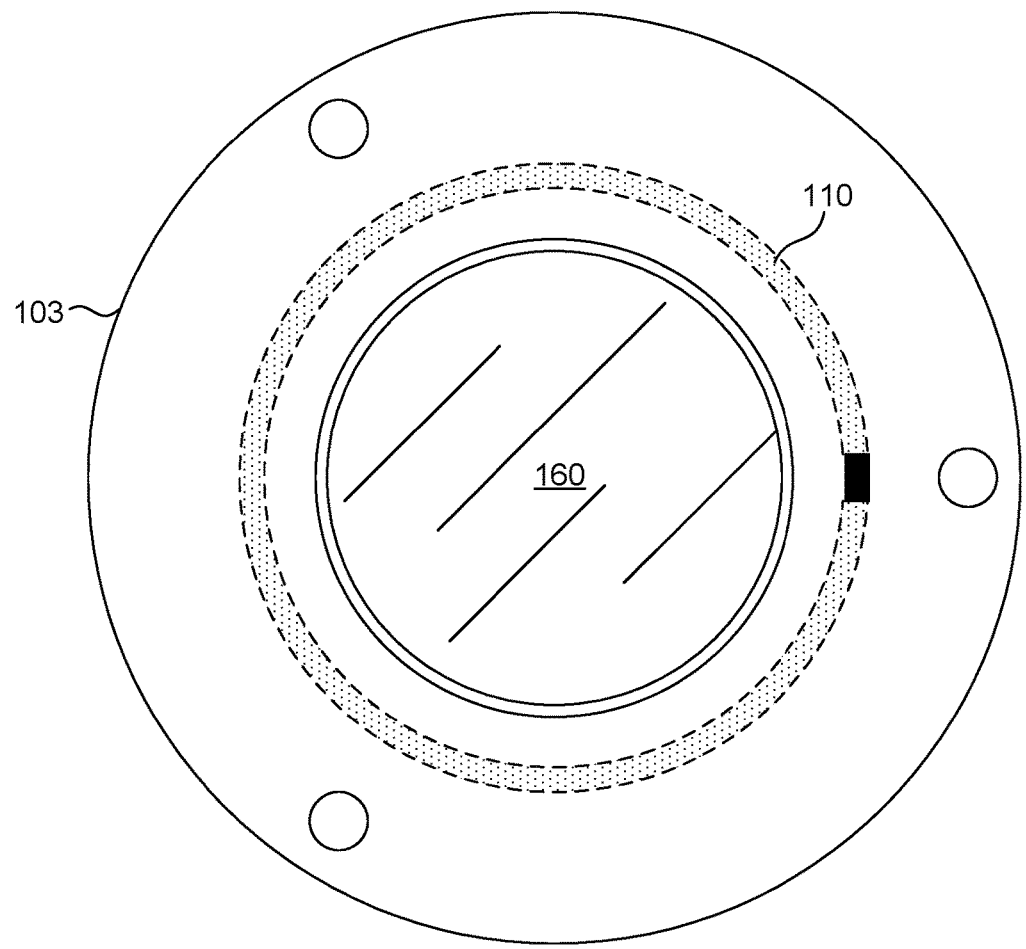
FIG. 11 illustrates a plan view of an upper housing, LED based light engine and an antenna.

In another further aspect, as depicted in FIG. 11, an antenna 110 is fit to upper housing 103 and is electrically coupled to EIM 120. In one embodiment, antenna 110 is fit into a groove of upper housing 103 and wraps around the circumference of upper housing 103. An electrical conductor electrically couples antenna 110 to EIM 120. In this manner, reception and transmission of wireless communications by EIM 120 is facilitated by antenna 110. The location of antenna 110 in upper housing 103 is advantageous because of the generally outward facing orientation of upper housing 103 in normal installations. Furthermore, the relatively large surface area of upper housing 103 allows for more flexibility in antenna design.

Examples of information transmitted by EIM 120 by any of the above-mentioned means includes accumulated elapsed time of illumination device 100, LED failure, serial number, occupancy sensed by occupancy sensor 35, flux sensed by on-board flux sensor 36, flux sensed by flux sensor 32, and temperature sensed by temperature sensor 31, and power failure condition. In addition, EIM 120 may receive messages by sensing a modulation or cycling of electrical signals supplying power to illumination device 100. For example, power line voltage may be cycled three times in one minute to indicate a request for illumination device 100 to communicate its serial number.

EIM 120 is configured to communicate LED illumination device information. As illustrated, information associated with the LED illumination device is stored locally, e.g., in non-volatile memory 23 and/or 26. The information, by way of example, may be a LED illumination device identifier such as a serial number, or information related to parameters, such as lifetime, flux, occupancy, LED or power failure conditions, temperature, or any other desired parameter. In some instances, the information is measured, such as lifetime, flux, or temperature, while in other instances, the information need not be measured, such as an illumination device identifier or configuration information. A request for information is received, e.g., by RF transceiver 24, IR transceiver, multiple protocol transceiver 40, or cycling the power line voltage. The LED illumination device information is communicated, e.g., by RF transceiver 24, IR transceiver, multiple protocol transceiver 40, or by controlling the light output from illumination device 100.

EIM 120 stores a serial number that individually identifies the illumination device 100 to which EIM 120 is a part. The serial number is stored in non-volatile memory 26 of EIM 120. In one example, non-volatile memory 26 is an erasable programmable read-only memory (EPROM). A serial number that identifies illumination device 100 is programmed into EPROM 26 during manufacture. EIM 120 may communicate the serial number in response to receiving a request to transmit the serial number (e.g. communication received by RF transceiver 24, IR transceiver 25, or multiple protocol transceiver 40). For example, a request for communication of the illumination device serial number is received onto EIM 120 (e.g. communication received by RF transceiver 24, IR transceiver 25, or multiple protocol transceiver 40). In response, processor 22 reads the serial number stored in memory 26, and communicates the serial number to any of RF transceiver 24, IR transceiver 25, or multiple protocol transceiver 40 for communication of the serial number from EIM 120.

EIM 120 includes temperature measurement, recording, and communication functionality. At power-up of illumination device 100, sensor interface 28 receives temperature measurements from temperature sensor 31. Processor 22 periodically reads a current temperature measurement from sensor interface 28 and writes the current temperature measurement to memory 23 as TEMP. In addition, processor 22 compares the measurement with a maximum temperature measurement value (TMAX) and a minimum temperature value (TMIN) stored in memory 23. If processor 22 determines that the current temperature measurement is greater than TMAX, processor 22 overwrites TMAX with the current temperature measurement. If processor 22 determines that the current temperature measurement is less than TMIN, processor 22 overwrites TMIN with the current temperature measurement. In some embodiments, processor 22 calculates a difference between TMAX and TMIN and transmits this difference value. In some embodiments, initial values for TMIN and TMAX are stored in memory 26. In other embodiments, when the current temperature measurement exceeds TMAX or falls below TMIN, EIM 120 communicates an alarm. For example, when processor 22 detects that the current temperature measurement has reached or exceeded TMAX, processor 22 communicates an alarm code over RF transceiver 24, IR transceiver 25, or multiple protocol transceiver 40. In other embodiments, EIM 120 may broadcast the alarm by controlling the light output from illumination device 100. For example, processor 22 may command the current supplied by power converter 30 to be periodically pulsed to indicate the alarm condition. The pulses may be detectable by humans, e.g. flashing the light output by illumination device 100 in a sequence of three, one second pulses every five minutes. The pulses may also be undetectable by humans, but detectable by a flux detector, e.g. pulsing the light output by illumination device 100 at one kilohertz. In these embodiments, the light output of illumination device 100 could be modulated to indicate an alarm code. In other embodiments, when the current temperature measurement reaches TMAX, EIM 120 shuts down current supply to LED circuitry 33. In other embodiments, EIM 120 communicates the current temperature measurement in response to receiving a request to transmit the current temperature.

EIM 120 includes elapsed time counter module 27. At power-up of illumination device 100, an accumulated elapsed time (AET) stored in memory 23 is communicated to ETCM 27 and ETCM 27 begins counting time and incrementing the elapsed time. Periodically, a copy of the elapsed time is communicated and stored in memory 23 such that a current AET is stored in non-volatile memory at all times. In this manner, the current AET will not be lost when illumination device 100 is powered down unexpectedly. In some embodiments, processor 22 may include ETCM functionality on-chip. In some embodiments, EIM 120 stores a target lifetime value (TLV) that identifies the desired lifetime of illumination device 100. The target lifetime value is stored in non-volatile memory 26 of EIM 120. A target lifetime value associated with a particular illumination device 100 is programmed into EPROM 26 during manufacture. In some examples, the target lifetime value may be selected to be the expected number of operating hours of illumination device 100 before a 30% degradation in luminous flux output of illumination device 100 is expected to occur. In one example, the target lifetime value may be 50,000 hours. In some embodiments, processor 22 calculates a difference between the AET and the TLV. In some embodiments, when the AET reaches the TLV, EIM 120 communicates an alarm. For example, when processor 22 detects that the AET has reached or exceeded the TLV, processor 22 communicates an alarm code over RF transceiver 24, IR transceiver 25, or multiple protocol transceiver 40. In other embodiments, EIM 120 may broadcast the alarm by controlling the light output from illumination device 100. For example, processor 22 may command the current supplied by power converter 30 to be periodically pulsed to indicate the alarm condition. The pulses may be detectable by humans, e.g. flashing the light output by illumination device 100 in a sequence of three, one second pulses every five minutes. The pulses may also be undetectable by humans, but detectable by a flux detector, e.g. pulsing the light output by illumination device 100 at one kilohertz. In these embodiments, the light output of illumination device 100 could be modulated to indicate an alarm code. In other embodiments, when the AET reaches the TLV, EIM 120 shuts down current supply to LED circuitry 33. In other embodiments, EIM 120 communicates the AET in response to receiving a request to transmit the AET.

In some embodiments, any of the parameters described with reference to FIG. 6 are communicated to gateway 200 and stored in memory 202. Moreover, processor 201 of gateway 200 is configured to determine summary status values associated with the LED based illumination device based at least in part on information stored in memory 202.

By way of non-limiting example, information communicated from LED based illumination device 100 to gateway 200 may include any of: a voltage supplied to one or more LEDs of the LED based illumination device, a current supplied to the one or more LEDs of the LED based illumination device, an electrical power consumed by the LED based illumination device, a temperature of the LED based illumination device, a time when the LED based illumination device transitions from an active state to an inactive state, and a time when the LED based illumination device transitions from an inactive state to an active state.

Figure 7:
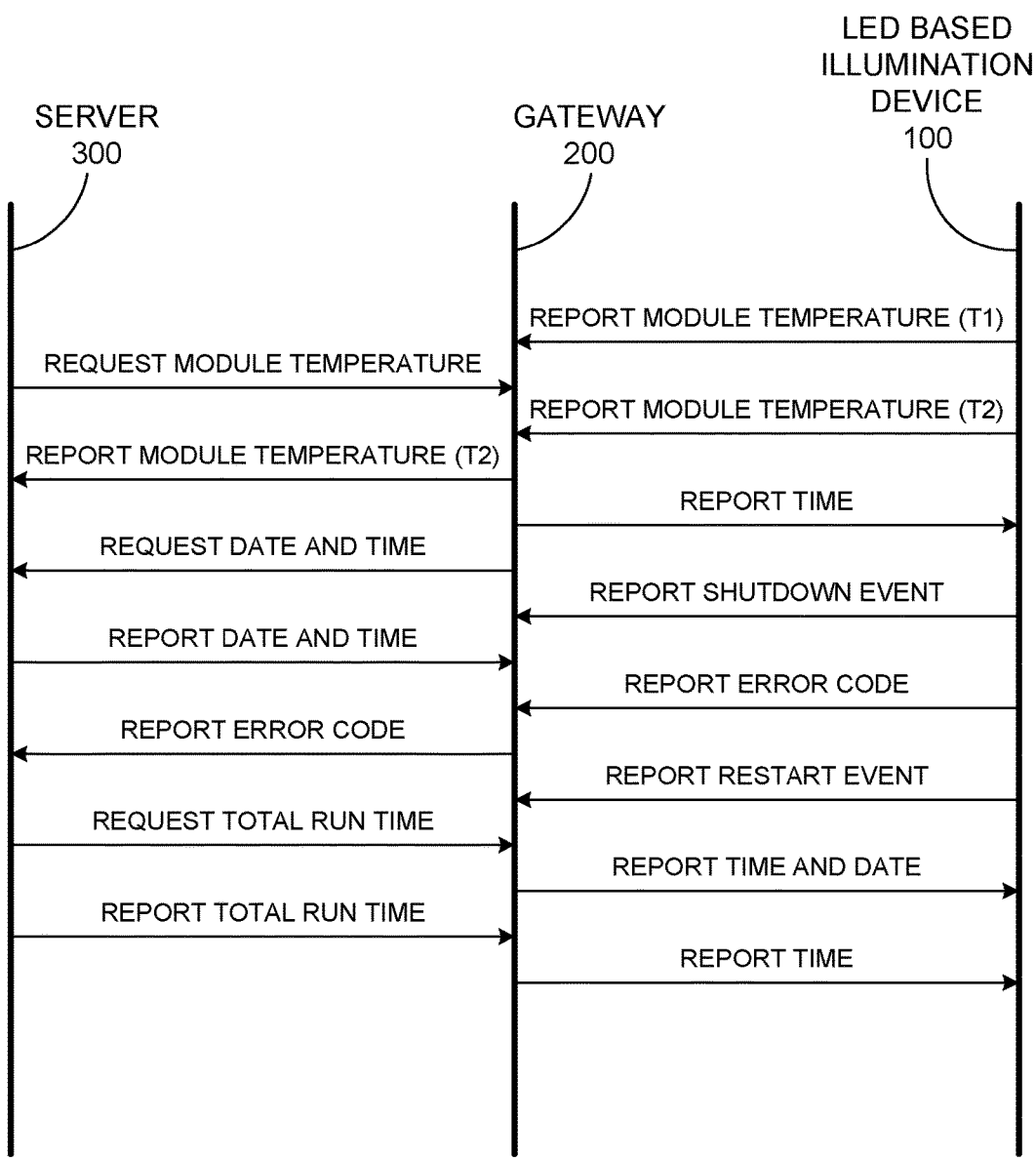
FIG. 7 illustrates a message flow between the LED based illumination device, gateway and server.

Status information communicated from LED based illumination device 100 to gateway 200 is stored in memory 202 for several purposes. In one example, the status information is stored on gateway 200 for rapid access and response to a request for status information by a device operating on the IP network, such as lighting information server 300. For example, as depicted in FIG. 7, the temperature of LED based illumination device 100 is periodically reported to gateway 200 (e.g., T1 and T2) and stored in memory 202. At a point in time, a request to report the temperature of LED based illumination device 100 is received by gateway 200 from lighting information server 300. In response, gateway 200 reads out the latest temperature value stored in memory 202 (T2) and communicates this value to lighting information server 300. This allows for a fast response time without having to access the LED based illumination device 100 over the bandwidth limited lighting control network to retrieve the current temperature. In this manner, status information associated with LED based illumination device 100 is cached in memory 202 of gateway 200 for rapid access and communication to devices communicatively coupled to gateway 200 over an IP network.

In another example, status information stored on gateway 200 is rapidly communicated to a device operating on the IP network without specific request. For example, as depicted in FIG. 7, at a point in time gateway 200 receives a shutdown flag from LED based illumination device 100 followed by an error code. The error code is stored in memory 202 of gateway 200. However, in addition, gateway 200 rapidly communicates the error code to lighting information server 300 for logging and reporting purposes.

In yet another example, the status information is stored on gateway 200 for further processing to generate summary status values based on the stored status information. For example, the total amount of time that the LED based illumination device has been in an active state may be computed based on the times between transitions from an inactive state to an active state and transitions from an active state to an inactive state. For example, as illustrated in FIG. 7, both shutdown and restart events are reported to gateway 200 by LED based illumination device 100. Gateway 200 includes real time clock 206 and is configured to associate the current time with each of the reported shutdown and restart events and store these times in memory 202. Thus, the times associated with transitions from an inactive state to an active state and transitions from an active state to an inactive state are stored in the memory 202 of the digital communications gateway 200. At a point in time, gateway 200 receives a request to report the total run time of LED based illumination device from lighting information server 300. In response, processor 201 is configured to compute the total amount of time that the LED based illumination device has been in an active state based on the times between transitions from an inactive state to an active state and transitions from an active state to an inactive state that are stored in memory 202.

In a further aspect, processor 201 of digital communications gateway 200 is configured to assign different internet protocol addresses to each LED based illumination device coupled to the lighting control network. In this manner, from the perspective of a device operating on the IP network, each LED based illumination device 100 coupled to the lighting control network appears directly visible and accessible. However, in reality, all requests for information associated with a particular LED based illumination device are received by gateway 200 and responses to these requests are generated based, either directly or indirectly, on status information cached in memory 202 of gateway 200.

In another aspect, a real time clock is maintained on gateway 200 and the date and time are periodically transmitted to LED based illumination device 100. As depicted in FIG. 5, gateway 200 includes real time clock module 206. Moreover, LED based illumination device 100 includes timer 50. Real time clock module 206 is configured to maintain a current date and time of day. RTC 206 periodically synchronizes with a time server accessible over the network operating in accordance with an internet protocol. In addition, as illustrated in FIG. 7, the current date and time of day maintained by RTC 206 are periodically communicated to LED based illumination device 100. In particular, as illustrated in FIG. 7, the current date and time of day maintained by RTC 206 is communicated to LED based illumination device 100 in response to receiving a message from the LED based illumination device 100 indicating that the LED based illumination device 100 has transitioned from an inactive state to an active state. In other words, when LED based illumination device 100 transitions from a powered down state, the current date and time of day are reported to the LED based illumination device so that the device can track its operation in real time.

In some examples, LED based illumination device 100 reports the time and date associated with a shutdown event or an error event to gateway 200. Gateway 200 stores this time and date in memory 202. Gateway 200 may report the stored time and date back to LED based illumination device 100 upon restart or clearing of the error event. In this manner, LED based illumination device 100 may determine the amount of time it was in an "off" state based on the recalled time and date and the current time and date reported by gateway 200.

By way of non-limiting example, an error code is indicative of any of an operating temperature exceeding a threshold value, an operating voltage exceeding a threshold value, an operating voltage below a threshold value, an operating current exceeding a threshold value, an operating current below a threshold value.

In another aspect, the effective data transmission rate over the lighting control network is increased by introducing a high speed communications protocol operating in conjunction with the slower, lighting control communications protocol.

As depicted in FIG. 5, LED based illumination device 100 includes a multiple protocol transceiver 40 to both receive and transmit signals over the set of conductors 170 in accordance with both the lighting control communications protocol (e.g., DALI, 0-10 Volts, etc.) and a high speed communications protocol having a data transmission rate that is more than twice the data transmission rate of the lighting control communications protocol.

Figure 8:
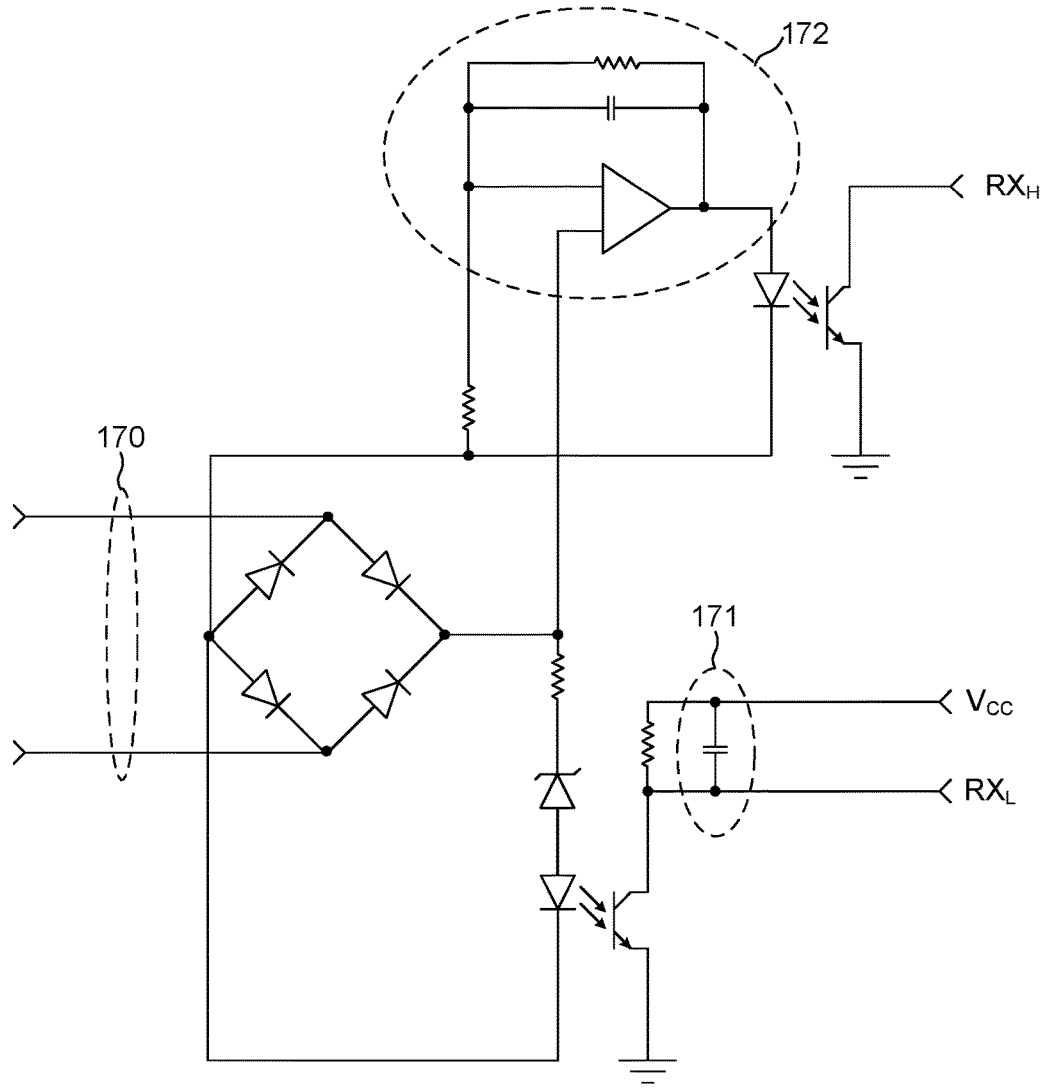
FIG. 8 illustrates a receiver circuit suitable for receiving signals over a DALI bus in accordance with the DALI protocol and a high speed communications protocol, simultaneously.

In some examples, both the high speed communication signals and the low speed communication signals are communicated simultaneously on the same set of conductors. FIG. 8 depicts a receiver circuit suitable for receiving signals over a DALI bus (e.g., conductors 170) in accordance with the DALI protocol and a high speed communications protocol, simultaneously. Circuit elements 171 are optionally included to low-pass filter the received signals on the DALI bus to improve the signal to noise ratio of the received low frequency digital signal, $RX_L$. Circuit elements 172 are included to add high frequency gain to the received signals on the DALI bust to amplify the received high frequency digital signal, $RX_H$.

Figure 9:
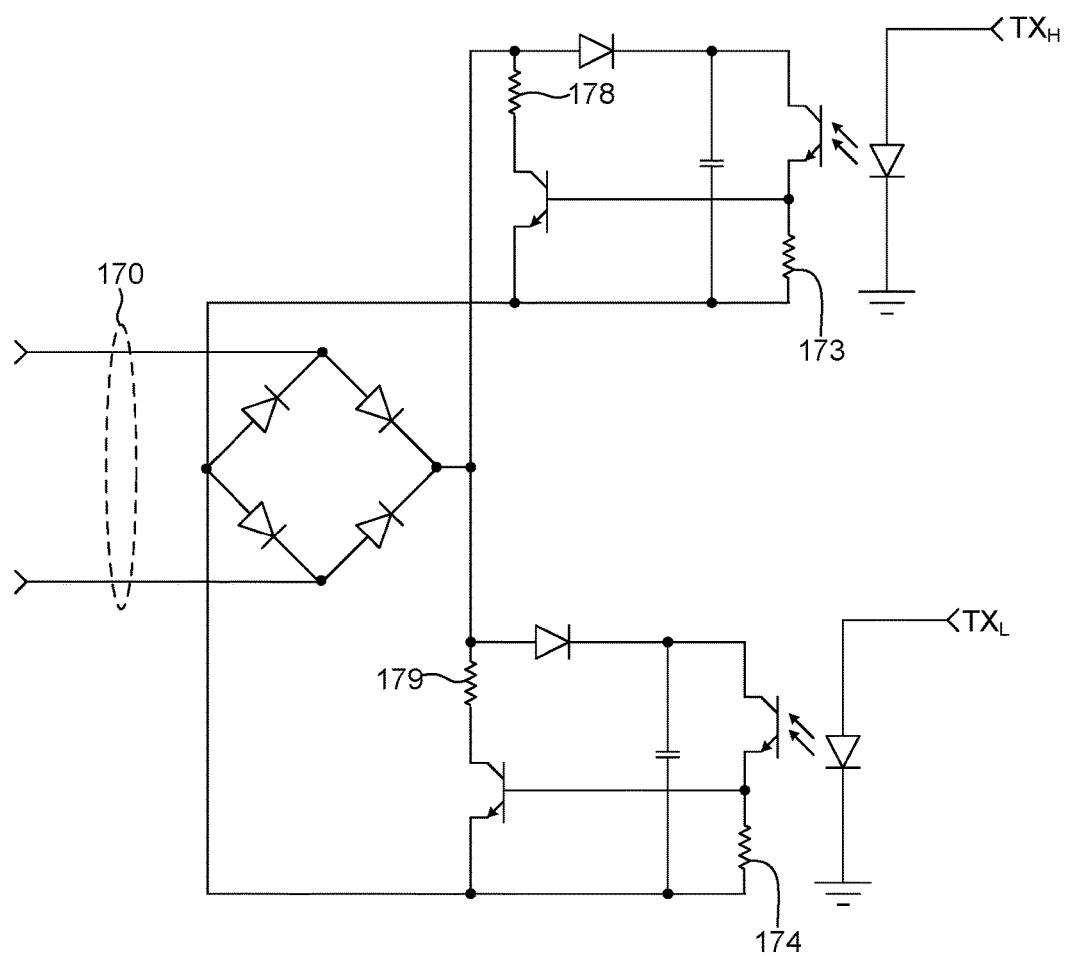
FIG. 9 illustrates a transmitter circuit suitable for transmitting signals over a DALI bus in accordance with the DALI protocol and a high speed communications protocol, simultaneously.

FIG. 9 depicts a transmitter circuit suitable for transmitting signals over a DALI bus (e.g., conductors 170) in accordance with the DALI protocol and a high speed communications protocol, simultaneously. Circuit elements 178 and 179 may be optionally configured in a filter arrangement to improve the signal to noise ratio of the digital signals transmitted on the DALI bus based on $TX_H$ and $TX_L$, respectively. The value of resistor 179 is selected to transmit low frequency digital signals (e.g., six ohms), and the value of resistor 178 is selected to transmit high frequency digital signals (e.g., six thousand ohms).

In some other embodiments, the communication of signals over the set of conductors 170 in accordance with both the lighting control communications protocol (e.g., DALI, 0-10 Volts, etc.) and a high speed communications protocol is achieved by a line sharing scheme. In one example, high speed communications may occur when lighting control communications are idle. In another example, conductors 170 may be shorted together for a period of time of high speed communication.

The ability to achieve high speed data communications over the lighting control network enables additional, data intensive devices to be added to the lighting control network.

In one example, LED based illumination device includes a wireless communications device. In one example, the wireless communications device is a short range radio subsystem that complies with the IEEE 802.15.4 standard. In another example, the wireless communications device is a radio subsystem that complies with the IEEE 802.11 standard (e.g., RF transceiver 24 depicted in FIG. 6). The wireless communications device is configured to transmit or receive an amount of data from device 502 that is external to the lighting control network. Data communicated between device 502 and the wireless communications device may be communicated to gateway 200, and ultimately to server 300.

Figure 10:
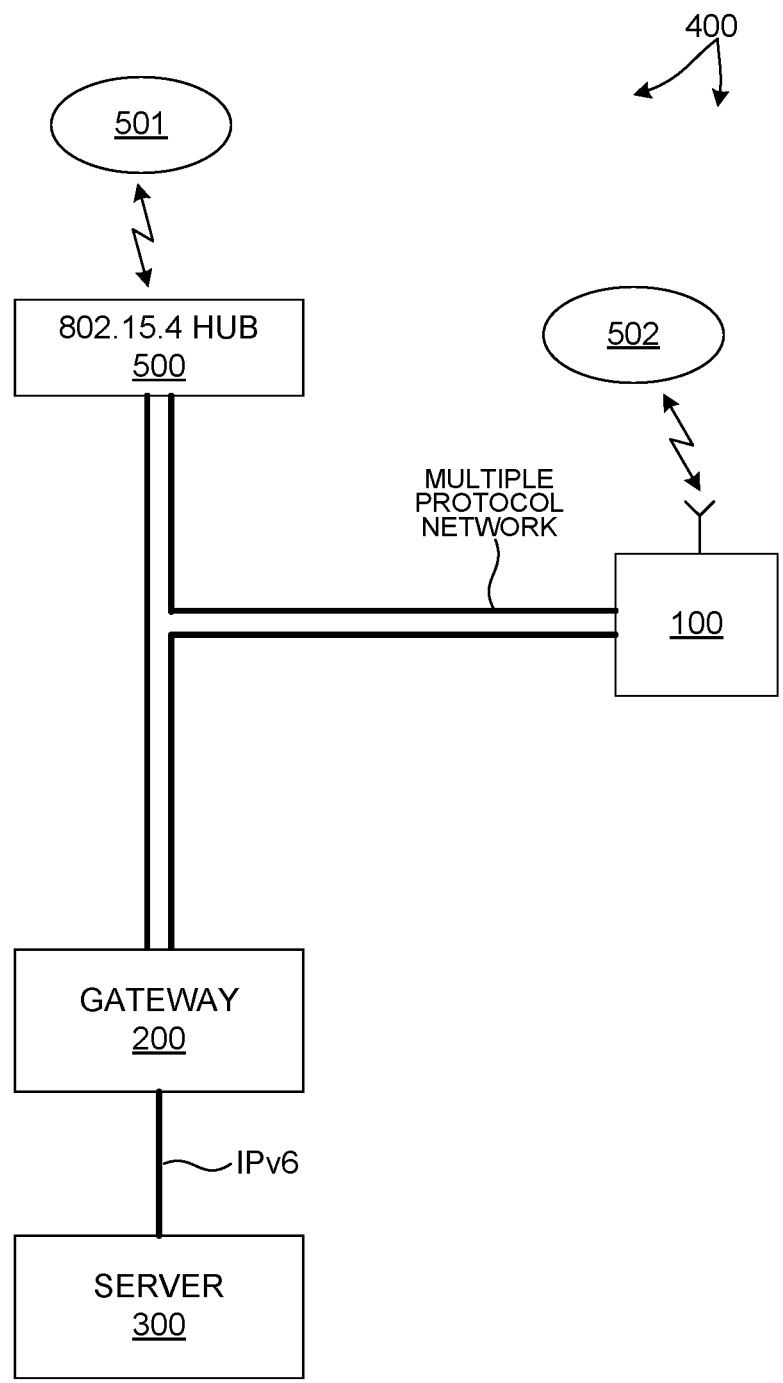
FIG. 10 illustrates a wireless communications device included as a node of the lighting control network.

In another example illustrated in FIG. 10, a wireless communications device 500 is included as a node of the lighting control network. In one example, the wireless communications device 500 includes s a short range radio subsystem that complies with the IEEE 802.15.4 standard. In another example, the wireless communications device includes a radio subsystem that complies with the IEEE 802.11 standard. Wireless communications device 500 is configured to receive an amount of data from device 501 that is external to the lighting control network. Data communicated between device 501 and wireless communications device 500 may be communicated to gateway 200, and ultimately to server 300.

Although certain specific embodiments are described above for instructional purposes, the teachings of this patent document have general applicability and are not limited to the specific embodiments described above. For example, EIM 120 is described as including bus 21, multiple protocol transceiver 40, processor 22, elapsed time counter module (ETCM) 27, an amount of non-volatile memory 26 (e.g. EPROM), an amount of non-volatile memory 23 (e.g. flash memory), infrared transceiver 25, RF transceiver 24, sensor interface 28, power converter interface 29, and power converter 30. However, in other embodiments, any of these elements may be excluded if their functionality is not desired. In another example, LED based illumination device 100 is depicted in FIGS. 1-2 as a part of a luminaire 150. However, LED based illumination device 100 may be a part of a replacement lamp or retrofit lamp or may be shaped as a replacement lamp or retrofit lamp. Accordingly, various modifications, adaptations, and combinations of various features of the described embodiments can be practiced without departing from the scope of the invention as set forth in the claims.

What is claimed is:

1. An LED based illumination device, comprising:
a receiver operable to receive a first communication over a pair of conductors and a second communication over the pair of conductors, wherein the first communication adhering to a lighting control communications protocol contains lighting control signals and the second communication adhering to a high speed communications protocol does not contain lighting control signals; and
a transmitter operable to transmit a third communication and a fourth communication over the pair of conductors, the third communication adhering to the lighting control communications protocol contains lighting control signals and the fourth communication adhering to the high speed communications protocol does not contain lighting control signals, wherein the LED based illumination device is configured to be part of a lighting control network, wherein a data transmission rate of the high speed communications protocol is more than twice a data transmission rate of the lighting control communications protocol.

2. The LED based illumination device of claim 1, wherein the first communication is received simultaneously with the second communication.

3. The LED based illumination device of claim 1, wherein the second communication is received when the lighting control network is idle.

4. The LED based illumination device of claim 3, wherein a first conductor of the pair of conductors is coupled to a second conductor of the pair of conductors before the second communication is received.

5. The LED based illumination device of claim 1, further comprising:
a wireless communications device configured to receive an amount of data from a device external to the lighting control network, and wherein the amount of data is communicated from the LED based illumination device to a device coupled to the pair of conductors.

6. The LED based illumination device of claim 5, wherein the wireless communications device is a short range radio subsystem that complies with IEEE 802.15.4 standard.

7. The LED based illumination device of claim 5, wherein the wireless communications device is a radio subsystem that complies with IEEE 802.11 standard.

8. The LED based illumination device of claim 5, wherein the device coupled to the pair of conductors is a digital communications gateway.

9. The LED based illumination device of claim 1, wherein the lighting control communications protocol is a digital addressable lighting interface (DALI) protocol.

10. The LED based illumination device of claim 1, wherein the lighting control signals in the first communication comprises a request for one or more parameter values of the LED based illumination device, and the lighting control signals in the third communication comprises a response with the one or more parameter values.

* * * * *